(12) United States Patent
Moriya et al.

(10) Patent No.: US 6,570,267 B1
(45) Date of Patent: May 27, 2003

(54) ANTITHEFT DEVICE FOR CONSTRUCTION MACHINERY

(75) Inventors: Naoyuki Moriya, Tokyo (JP); Hideto Furuta, Tokyo (JP)

(73) Assignee: Shin Caterpillar Mitsubishi Ltd., Tokyo (JP)

( * ) Notice: Subject to any disclaimer, the term of this patent is extended or adjusted under 35 U.S.C. 154(b) by 0 days.

(21) Appl. No.: 09/553,388

(22) Filed: Apr. 20, 2000

Related U.S. Application Data

(63) Continuation of application No. PCT/JP99/03302, filed on Jun. 22, 1999.

(30) Foreign Application Priority Data

Aug. 24, 1998 (JP) .......................................... 10-237049

(51) Int. Cl.$^7$ .......................... B60R 25/00; H01H 47/22
(52) U.S. Cl. .................... 307/10.2; 307/10.1; 307/10.2; 307/10.3; 307/10.4; 307/10.5; 307/10.6; 340/5.31; 340/5.65; 91/459; 91/461; 91/361; 91/521; 91/527; 70/245; 70/247; 70/237
(58) Field of Search ...................... 307/10.1, 10.2–10.5; 180/287; 91/459, 461, 527; 340/5.31, 5.65; 70/245, 247, 237

(56) References Cited

U.S. PATENT DOCUMENTS

| | | | | |
|---|---|---|---|---|
| 5,632,190 A | * | 5/1997 | Sunamura et al. | ............. 91/459 |
| 5,861,816 A | * | 1/1999 | Funakoshi et al. | ......... 307/10.1 |
| 5,982,292 A | * | 11/1999 | Tagawa et al. | ............ 307/10.3 |
| 6,133,649 A | * | 10/2000 | Iwamoto et al. | ........... 307/10.5 |

FOREIGN PATENT DOCUMENTS

| | | |
|---|---|---|
| EP | 744502 | 5/1996 |
| JP | 61-229645 | 10/1986 |
| JP | 8-318821 | 12/1996 |
| JP | 9-050584 | 2/1997 |
| KR | 1019950055211 | 12/1998 |

OTHER PUBLICATIONS

Abstract, antitheft device for vehicle and control method theeof.

* cited by examiner

Primary Examiner—John A. Follansbee
Assistant Examiner—Luke T. Huynh
(74) Attorney, Agent, or Firm—Millen, White, Zelano & Branigan, P.C.

(57) ABSTRACT

In the construction machinery equipped with an engine, a hydraulic control unit and a machine controller, there is provided an antitheft device for the construction machinery, which can prevent the engine from starting and the hydraulic control unit from working with reliability no matter how the starter circuit of the engine is modified.

The initial state of the machine controller is so set that the fuel injection by a fuel injection unit of the engine is halted and that the operations of control units in the hydraulic control unit are halted, and an antitheft control unit is provided to release the initial state of the machine controller upon receiving a release signal from the antitheft control unit.

17 Claims, 1 Drawing Sheet

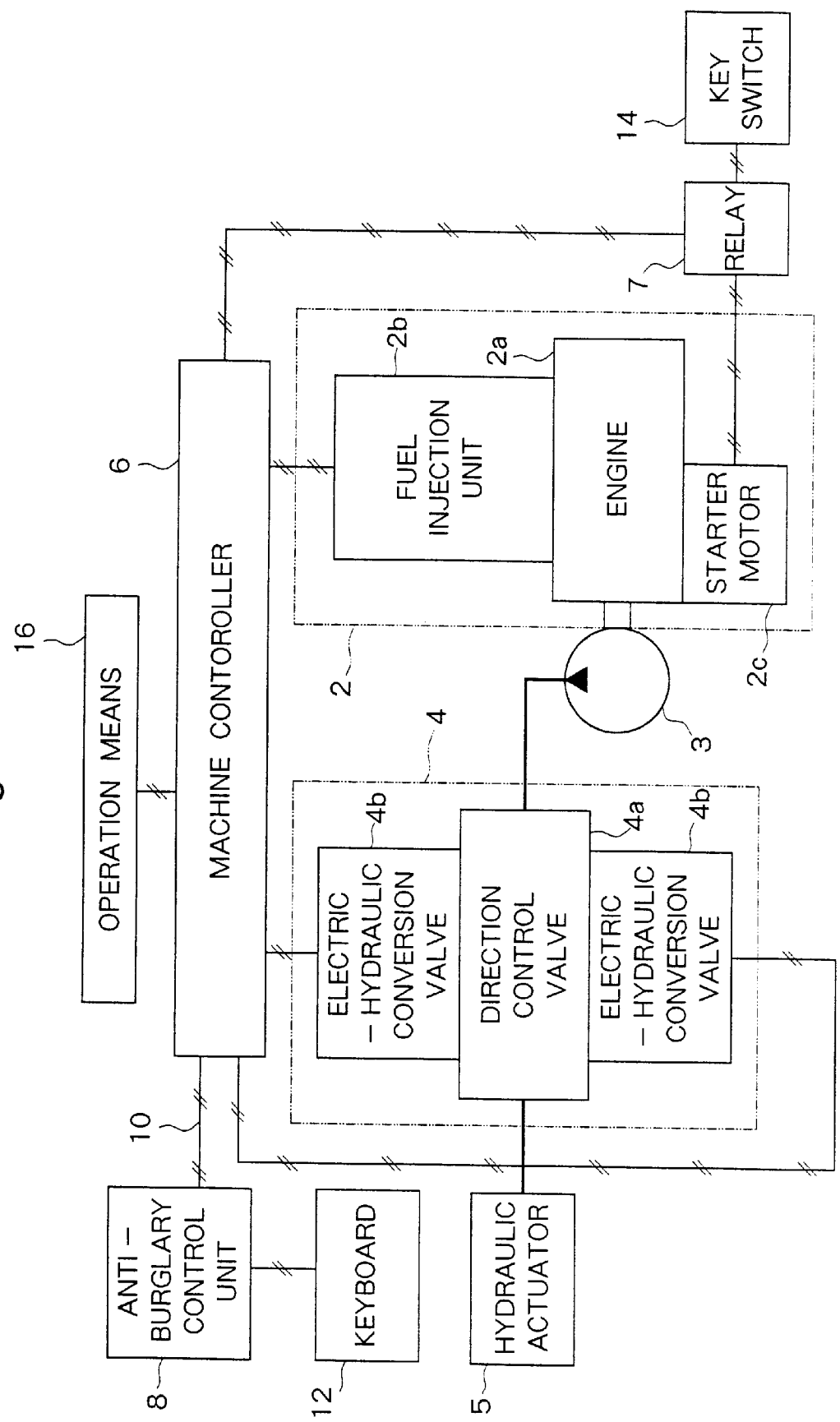

ANTITHEFT DEVICE FOR CONSTRUCTION MACHINERY

This application is a continuation of International Application PCT/JP99/03302, filed Jun. 22, 1999, designating the United States, priority of which is claimed under 35 U.S.C. §120.

TECHNICAL FIELD

The present invention relates to an antitheft device for the construction machinery and, more specifically, to an antitheft device for preventing any attempt of thieving a vehicle of construction machinery equipped with an engine and hydraulic control unit.

BACKGROUND ART

As an antitheft device for a construction machine such as hydraulic shovel, bulldozer, etc., a key switch is provided in a circuit that connects a starter motor in the engine starter circuit to a battery. The key switch has, for example, an engine key of a pattern different for every machine, and the circuit is allowed to flow the electric current by using the engine key. Therefore, the key switch can be operated by using a predetermined engine key only to actuate the starter motor so as to start the engine. Thus, the machine is prevented from being thieved by a person who attempts to thieve the construction machine without having a right engine key.

DISCLOSURE OF THE INVENTION

The antitheft device for the construction machinery of the above-mentioned conventional form has problems that must be solved as described below. That is, a person who intends to thieve the construction machine modifies the key switch part in the engine starter circuit to connect the circuit to establish its function, and feeds the electric power from the battery to the starter motor so as to start the engine. If the circuit is connected, the machine controller that controls the operation of the engine and of the working unit is actuated to enable the machine to move and hence, it is no longer possible to prevent the attempt to thieve the machine.

The present invention was pursued in view of the above-mentioned fact, and its technical subject is to provide an antitheft device for the construction machinery, which reliably makes it impossible to start the engine and to actuate the hydraulic control unit even though the starter circuit of the engine of the construction machine is modified.

In the present invention, as an antitheft device for the construction machinery, which solves the above-mentioned technical subject, there is provided an antitheft device for the construction machinery having an engine, a hydraulic control unit and a machine controller for controlling the engine and the hydraulic control unit, wherein the initial state of the machine controller is so set that the fuel injection by a fuel injection unit of the engine is halted and that the operations of control units in the hydraulic control unit are halted; and an antitheft control unit is provided and the initial state of the machine controller is released upon receiving a release signal from the antitheft control unit.

Further, it is not permitted to operate to start the engine actuate the hydraulic control unit unless a release signal is input to the machine controller from the antitheft control unit.

In a preferred embodiment, the antitheft control unit is connected to the machine controller through a communication circuit. Further, the antitheft control unit has an input unit through which a personal identification number is input as the release signal.

It is therefore made possible to reliably prevent the machine from being thieved by a person who attempts to thieve the machine, since the antitheft control unit is connected to the machine controller through the communication circuit, and the initial state (fuel injection into the engine is halted and operations of the hydraulic control units are halted) of the machine controller is released by the personal identification number.

In the present invention, the hydraulic control unit controls the workings of the hydraulic actuators of the operation units in the construction machinery, and the control units are hydraulic units such as directional control valve, pressure control valve and the like for the hydraulic control.

BRIEF EXPLANATION OF THE DRAWING

FIG. 1 is a diagram illustrating the constitution of a control system equipped with an antitheft device for construction machinery constituted according to the present invention.

BEST MODE FOR CARRYING OUT THE INVENTION

A preferred embodiment of the antitheft device for the construction machinery constituted according to the present invention will now be described in further detail with reference to FIG. 1.

The construction machine includes an engine 2, a hydraulic control unit 4, and a machine controller 6 for controlling the actuation of the engine 2 and of the hydraulic control unit 4. An antitheft control unit 8 is connected to the machine controller 6 through a communication circuit 10. The antitheft control unit 8 has an input unit 12.

The engine 2 is equipped with a fuel injection unit 2b having an injector for injecting fuel into the engine body 2a. Upon receiving control signals from the machine controller 6, the fuel injection unit 2b is controlled for its operation for starting and stopping the fuel injection and for determining the amount of fuel injection. The engine body 2a is provided with a starter motor 2c. The starter motor 2c starts and stops according to operation of a key switch 14. A relay 7 controlled by a signal from the machine controller 6 is provided between the key switch 14 and the starter motor 2c. The engine 2 drives a hydraulic pump 3 coupled to the output shaft thereof and feeds the discharge fluid to the hydraulic control unit 4.

The hydraulic control unit 4 controls the direction of flow, flow rate and pressure of the working fluid fed to hydraulic actuators 5 such as hydraulic cylinders and hydraulic motors of the operation units in the construction machine. The hydraulic control unit 4 includes control units such as directional control valve 4a and the like. The directional control valve 4a that is illustrated has control spools of a number corresponding to the number of the hydraulic actuators 5, and electro-hydraulic converter valves 4b are connected to the control spools. In response to a control signal from the machine controller 6, the electro-hydraulic converter valve 4b produces a hydraulic pressure corresponding to the control signal, and changes over the control spools of the directional control valve 4a by the hydraulic pressure force.

An operation means 16 is connected to the machine controller 6 through a circuit. The operation means 16 is constituted by levers, pedals, switches and the like that are operated by an operator of the construction machine, and sends the operation signals corresponding to the operations to the machine controller 6.

The machine controller 6 is an electronic control means having a microprocessor, and unitarily controls the fuel injection amount (engine output) of the engine 2 and the flow of working fluid (workings of the hydraulic actuators) of the hydraulic control unit 4 based on a program that has been set in advance and on the operation signals from the operation means 16. The machine controller 6 in the present invention sets, as the initial state, to halt the fuel injection of the fuel injection unit of the engine 2 and to halt the workings of the electro-hydraulic converter valves 4b of the directional control valve 4a in the hydraulic control unit 4. The initially set state is maintained and is not released as long as a release signal is not input. When the initially set state is released, the fuel can be injected and the hydraulic unit can be controlled by the machine controller 6. Then, as the engine 2 is started, the fuel is properly injected to maintain the revolution of the engine 2 and consequently, the hydraulic actuators in the operation unit properly work. The machine controller 6 may be divided into the one for the engine 2 and the one for the hydraulic control unit 4, but may be a single unit.

The antitheft control unit 8 is a means for producing a release signal to release the initial state of the machine controller 6 and to actuate the machine controller 6 based on the program that has been set in advance. The keyboard 12 that is an input unit for inputting numeric data is connected to the antitheft control unit 8. The operator who intends to operate the construction machine uses the keyboard 12 to input his personal identification number of a predetermined length as a release signal. The antitheft control unit 8 has a personal identification number-judging unit, and sends, through the communication circuit 10, the release signal to the machine controller 6 to release its initial setting when it is recognized that an input personal identification number is correct as a result of comparing the personal identification number that has been registered in advance with the personal identification number that has been input.

Upon operating the key switch 14 of the starter motor 2c of the engine 2, the electric power is supplied, and the communication between the antitheft control unit 8 and the machine controller 6 starts through the communication circuit 10.

The above-mentioned function of the antitheft device for the construction machinery will now be described with reference to FIG. 1.

(1) The operator inputs his right personal identification number of a predetermined length as a release signal by using the keyboard 12. Then, the antitheft control unit 8 compares the above personal identification number with the personal identification number that has been registered in advance, recognizes the personal identification number, and sends, through the communication circuit 10, a release signal to the machine controller 6 to release its initial setting.

(2) When no personal identification number is input or an incorrect personal identification number is input to the keyboard 12, no release signal is output. Therefore, the engine 2 does not start no matter how the operation means 16 and the key switch 14 are operated. Even if the starter motor 2c is connected to the battery to supply the electric power to actuate it, the fuel injection unit 2b is still in the state of halting the injection of fuel and consequently, the engine 2 does not start.

(3) Besides, the control units such as directional control valve 4a and the like of the hydraulic control unit 4 are also in the halted state. Therefore, even if the engine 2 is started somehow, the hydraulic control unit 4 does not work and hence, the hydraulic actuators 5 do not work. Accordingly, it is not allowed to change the positions of the operation units of the construction machine, i.e., it is not allowed to change the positions of the boom of the hydraulic shovel, arms, etc., into positions that permit the machine to move. It is not, therefore, allowed to move the machine.

(4) Conversely, even if the hydraulic control unit 4 is operated somehow, the engine 2 is in the state where the injection of fuel is halted. Accordingly, since the engine 2 does not start and working fluid is not discharged from the hydraulic pump 3 driven by the engine 2, the hydraulic actuators 5 of the operation units can not be actuated, and the machine is not allowed to move, either.

(5) The injection of fuel is halted and the hydraulic units are halted by setting the software in the machine controller 6. Therefore, even if it is attempted to modify the electric circuit of the construction machine, the setting is not released and hence, the machine does not become in a state of being moved.

(6) The release signal from the antitheft control device 8 has been transmitted through the communication circuit 10, and it is substantially impossible to forge the release signal.

(7) Further, even if the antitheft control device 8 is removed, the machine controller 6 is in the initial state where the injection of fuel is halted and the operations of the hydraulic units are halted and hence, it is impossible to move the machine.

(8) In a case where it is repetitively attempted to start the engine 2 by using the key switch 14 without becoming aware that the construction machine has been equipped with the antitheft device, there is likelihood that the battery may be finally be run out completely. By utilizing the machine controller 6, therefore, it is desired to place the starter motor 2c in a halted state where it can not rotate, by using the relay 7 and the like provided in the starter circuit of the engine 2.

According to the antitheft device for the construction machinery constituted in accordance with the present invention, there is provided an antitheft device for the construction machinery, which can prevent the engine from starting and the hydraulic control unit from working with reliability no matter how the starter circuit of the engine of the construction machine is modified.

What is claimed is:

1. An antitheft device for the construction machinery in a construction machine equipped with an engine, a hydraulic control unit and a machine controller for controlling said engine and said hydraulic control unit, wherein the initial state of said machine controller is so set that the fuel injection by a fuel injection unit of said engine is halted and that the operations of control units in said hydraulic control unit are halted; and an antitheft control unit is provided and the initial state of said machine controller is released upon receiving a release signal from said antitheft control unit.

2. An antitheft device for the construction machinery according to claim 1, wherein said antitheft control unit is connected to said machine controller through a communication circuit.

3. An antitheft device for the construction machinery according to claim 1, wherein said antitheft control unit has an input unit through which a personal identification number is input as the release signal.

4. An anti-theft device for a construction machine comprising an anti-theft control unit (8) for producing a release signal, an engine (2) having a fuel injection unit (2b) and a hydraulic control unit (4), and whereby the operation of the fuel injection unit (2b) and the hydraulic control unit (4) are halted until the anti-theft control unit (8) provides a release signal.

5. An anti-theft control device according to claim 4, further comprising a machine controller (6) for controlling said engine and hydraulic control unit(4), whereby the operation of the fuel injection unit (2b) and the hydraulic control unit (4) are halted until the anti-theft control unit (8) provides a release signal to the machine controller (6).

6. An anti-theft control device according to claim 5, whereby the machine controller (6) may be divided into one for the engine and one for the hydraulic control unit.

7. An anti-theft control device according to claim 5, whereby the machine controller (6) may be a single unit.

8. An anti-theft control device according to claim 4, whereby the anti-theft control unit is connected to a keyboard for inputting numeric data.

9. An anti-theft control device according to claim 5, whereby the machine controller generates a release signal when input numeric data matches numeric data that has been registered in advance.

10. An anti-theft control device according to claim 4, further comprising a key switch to start a starter motor on the engine.

11. An anti-theft control device according to claim 5, whereby the machine controller does not generate a release signal when input numeric data does not match numeric data that has been registered in advance.

12. An anti-theft control device according to claim 4, whereby the release signal from the anti-theft control device is transmitted through a communication circuit.

13. An anti-theft control device according to claim 4, whereby the hydraulic control unit is a directional control valve or a pressure control valve.

14. An anti-theft control device according to claim 5, whereby the machine controller is an electronic control means having a microprocessor.

15. An anti-theft control device according to claim 14, whereby the machine controller unitarily controls the fuel injection amount of the engine and the flow of the working fluid in the hydraulic control unit.

16. An anti-theft control device according to claim 4, whereby the hydraulic control unit controls the working fluid fed to hydraulic actuators.

17. An anti-theft control device according to claim 16, whereby the hydraulic control unit controls the direction of flow, flow rate and pressure of the working fluid.

* * * * *